(12) United States Patent
Li et al.

(10) Patent No.: US 7,474,499 B2
(45) Date of Patent: Jan. 6, 2009

(54) SHIELDED ENCLOSURE OF A DISC DRIVE FOR REDUCING PENETRATION AND INFLUENCE OF STRAY FIELDS

(75) Inventors: Shaoping Li, Naperville, IL (US); Daniel John Brown, Woodbury, MN (US); Michael R. Montemorra, Longmont, CO (US); Nurul Amin, Woodbury, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 576 days.

(21) Appl. No.: 11/190,739

(22) Filed: Jul. 27, 2005

(65) Prior Publication Data

US 2007/0025013 A1 Feb. 1, 2007

(51) Int. Cl.
*G11B 5/012* (2006.01)
*G11B 17/00* (2006.01)

(52) U.S. Cl. .................................. 360/97.01; 360/97.02
(58) Field of Classification Search .............. 360/97.01
See application file for complete search history.

(56) References Cited

U.S. PATENT DOCUMENTS

| | | | | |
|---|---|---|---|---|
| 3,721,746 A | * | 3/1973 | Knappenberger | 174/372 |
| 3,816,911 A | * | 6/1974 | Knaooenberger | 29/841 |
| 4,582,729 A | * | 4/1986 | Tsiamis et al. | 427/304 |
| 4,647,714 A | * | 3/1987 | Goto | 174/36 |
| 5,285,007 A | * | 2/1994 | Deluca et al. | 174/387 |
| 5,539,148 A | * | 7/1996 | Konishi et al. | 174/391 |
| 5,561,265 A | * | 10/1996 | Livshits et al. | 174/386 |
| 5,571,991 A | * | 11/1996 | Highum et al. | 174/386 |
| 5,636,091 A | * | 6/1997 | Asano | 360/264.3 |
| 5,654,847 A | * | 8/1997 | Yagi et al. | 360/97.02 |
| 5,739,975 A | | 4/1998 | Parks et al. | 360/81 |
| 5,761,000 A | | 6/1998 | Ahn | 360/99.08 |
| 5,821,453 A | | 10/1998 | Epstein et al. | 174/35 |
| 5,821,454 A | | 10/1998 | Babb et al. | 174/35 |
| 5,841,067 A | * | 11/1998 | Nakamura et al. | 174/382 |
| 6,138,347 A | * | 10/2000 | Persson et al. | 29/836 |
| 6,455,770 B2 | * | 9/2002 | Pulver | 174/394 |
| 6,639,144 B1 | | 10/2003 | Toh | 174/35 |
| 6,652,768 B2 | * | 11/2003 | Aoki et al. | 252/62.56 |
| 6,936,763 B2 | * | 8/2005 | Rizzo et al. | 174/391 |

(Continued)

FOREIGN PATENT DOCUMENTS

JP 03090546 A * 4/1991

(Continued)

*Primary Examiner*—Angel Castro
*Assistant Examiner*—Christopher R. Magee
(74) *Attorney, Agent, or Firm*—Westman, Champlin & Kelly, P.A.; Leanne Taveggia Farrell (57) ABSTRACT

The present invention includes a data storage system. The data storage system includes an enclosure and at least one perpendicular recording device positioned within the enclosure and in communication with a recording medium. The recording medium includes a layer of magnetic material that has a permeability that is substantially similar to a permeability of a magnetic material in the recording device. The data storage system also includes a soft magnetic material included in the enclosure for shielding magnetic stray fields from the perpendicular recording device. The soft magnetic material has a permeability that is at least as great as approximately the permeability of the layer of magnetic material of the recording medium.

20 Claims, 6 Drawing Sheets

U.S. PATENT DOCUMENTS

2002/0171982 A1    11/2002    Lairson et al. .............. 360/319

FOREIGN PATENT DOCUMENTS

| JP | 03191041 A | * | 8/1991 |
| JP | 10055662 A | * | 2/1998 |
| JP | 10069763 A | * | 3/1998 |
| JP | 2002050171 A | * | 2/2002 |

* cited by examiner

SHIELDED ENCLOSURE OF A DISC DRIVE FOR REDUCING PENETRATION AND INFLUENCE OF STRAY FIELDS

FIELD OF THE INVENTION

The present invention relates generally to data storage systems. In particular, the present invention relates to a soft magnetic material included in a data storage system for shielding stray fields.

BACKGROUND OF THE INVENTION

A typical data storage system includes a rigid housing having a base and a cover that encloses a variety of components. The components include one or more discs having data surfaces that are coated with a magnetizable medium for storage of digital information in a plurality of circular, concentric data tracks. The discs are mounted on a spindle motor that causes the discs to spin and the data surfaces of the discs to pass under respective aerodynamic bearing disc head sliders. The sliders carry magnetic transducers, which write information to and read information from the data surfaces of the discs. Typically, magnetic transducers or magnetic heads include an inductive recording or write head for generating a magnetic field that aligns the magnetic moments of the recording layer of a magnetic medium to represent desired bits of data. In addition, transducers include a read element that is configured to read magnetic flux transitions recorded to data tracks on the medium which represent the bits of data.

The components also include an actuator mechanism that moves the sliders across the data surfaces of the discs. The actuator mechanism includes a motor, such as a voice coil motor (VCM), a track accessing arm and suspensions that support the sliders. The voice coil motor is operated so as to move the actuator mechanism about an actuator pivot center such that the sliders move from track-to-track across the data surface of a disc.

Magnetic recording heads include either longitudinal or perpendicular recording techniques. Perpendicular recording is a form of magnetic recording in which magnetic moments representing bits of data are oriented perpendicularly to the surface of the recording layer of the recording medium, as opposed to longitudinally along a track of the medium as in the more traditional longitudinal recording technique. Currently, there is an increased use of perpendicular recording techniques because of its ability to put more bits of data per square inch of disc space (i.e. areal density) as well as its ability to retain its magnetic charge (i.e. coercivity). However, the influence of external stray fields that originate external to the data storage system and internal stray fields that originate internal to the data storage system can detrimentally effect perpendicular recording compared to traditional longitudinal recording. In some conditions, stray fields can generate a localized magnetic field at the magnetic recording head and cause a variety of reliability issues on the perpendicular recording process. Examples include destabilization of magnetized media, reorientation of recorded magnetized media and, in some circumstances, the generation of media magnetization reversal in non-operation modes if the stray field becomes concentrated and amplified.

Embodiments of the present invention provide solutions to these and other problems, and offer other advantages over the prior art.

SUMMARY OF THE INVENTION

The present invention includes a data storage system. The data storage system includes an enclosure and at least one perpendicular recording device positioned within the enclosure and in communication with a recording medium. The recording medium includes a layer of magnetic material that has a permeability that is substantially similar to a permeability of a magnetic material in the recording device. The data storage system also includes a soft magnetic material included in the enclosure for shielding magnetic stray fields from the perpendicular recording device. The soft magnetic material has a permeability that is at least as great as approximately the permeability of the layer of magnetic material of the recording medium.

The present invention also includes an enclosure system. The enclosure system includes an enclosure having inner and outer surfaces. The enclosure system also includes a device positioned within the enclosure that generates internal magnetic stray fields and a soft magnetic material coated on at least a portion of the inner surface of the enclosure. The soft magnetic material configured to absorb the internal magnetic stray fields.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
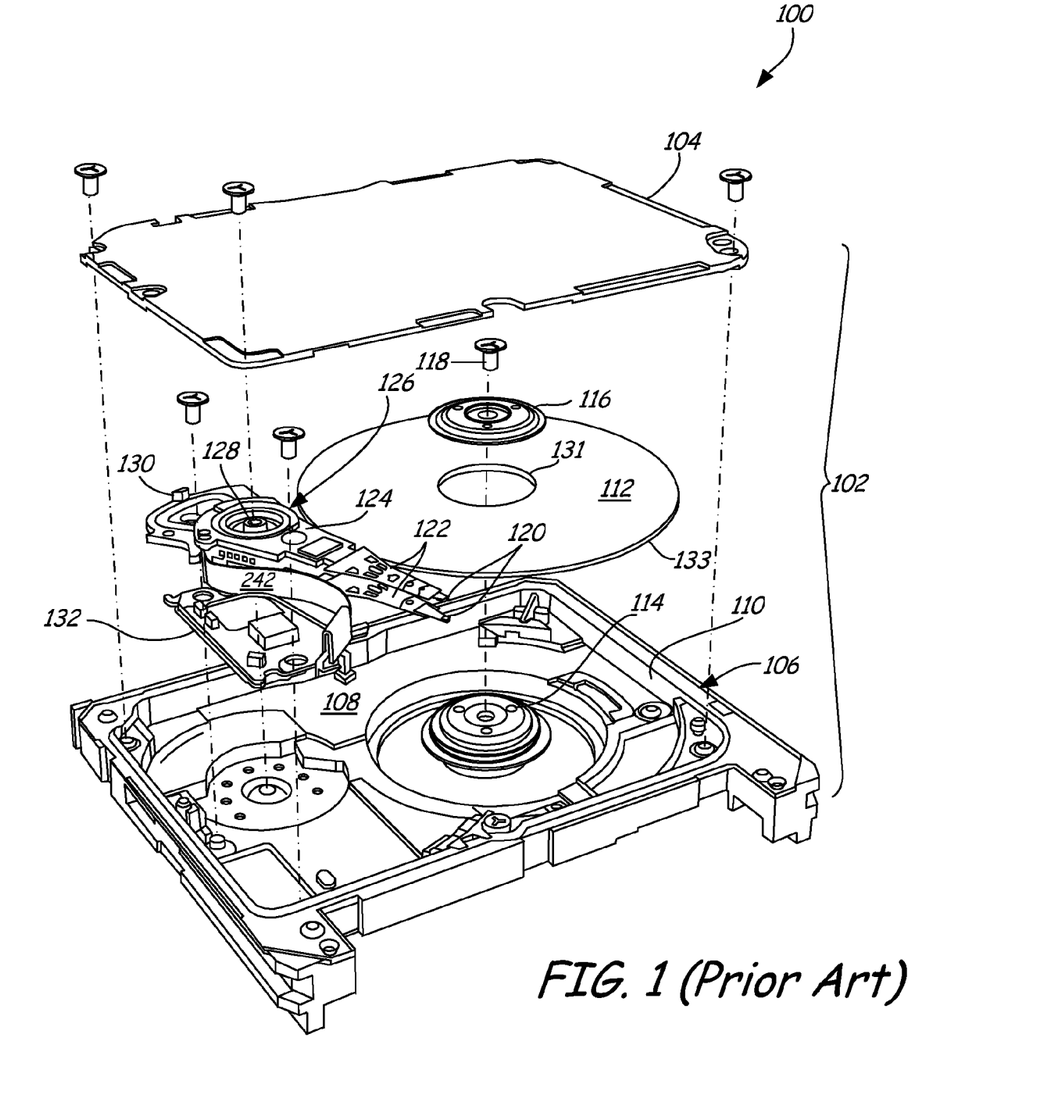
FIG. 1 illustrates an exploded perspective view of a data storage system.

FIG. 1 is an exploded perspective view of a disc drive 100 in which embodiments of the present invention are useful. Disc drives are common data storage systems. Disc drive 100 includes a housing 102 having a cover 104 and a base 106. As shown, cover 104 attaches to base 106 to form an enclosure 108 enclosed by a perimeter wall 110 of base 106.

The components of disc drive 100 are assembled to base 106 and are enclosed in enclosure 108 of housing 102. As shown, disc drive 100 includes a disc or medium 112. Although FIG. 1 illustrates medium 112 as a single disc, those skilled in the art should understand that more than one disc can be used in disc drive 100. Medium 112 is mounted on a spindle motor assembly 114 by a disc clamp 116 and pin 118. Each surface of the medium has an associated slider 120, which carries a read/write head for communication with the surface of the medium 112. In the example shown in FIG. 1, sliders 120 are supported by suspensions 122 which are in turn attached to track accessing arms 124 of an actuator mechanism 126. Actuator mechanism 126 is rotated about a shaft 128 by a voice coil motor 130, which is controlled by servo control circuitry within internal circuit 132. As voice coil motor 130 rotates actuator mechanism 126, sliders 120 move between a disc inner diameter 131 and a disc outer diameter 133.

Figure 2:
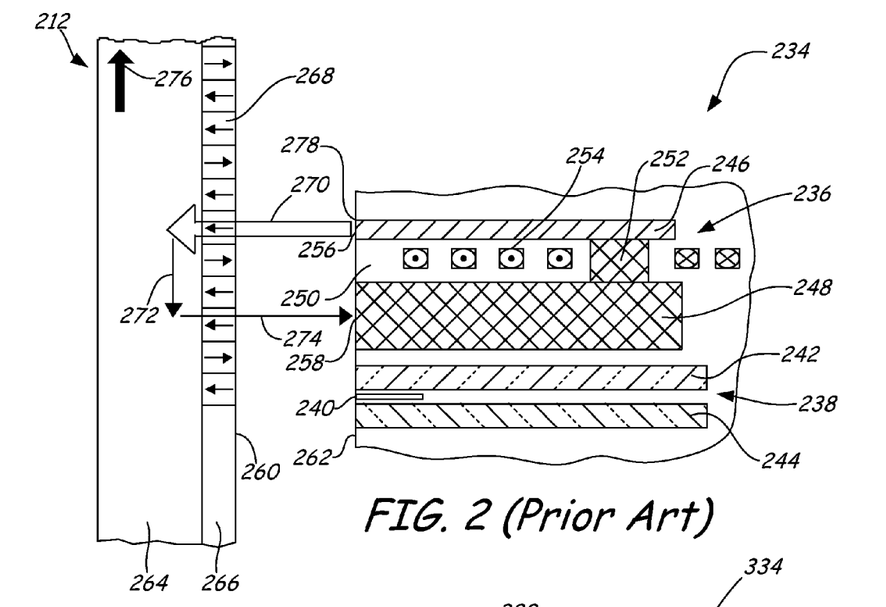
FIG. 2 is an enlarged partial sectional view of a read/write transducer illustrating a process of perpendicularly recording to a recording medium.

FIG. 2 illustrates an enlarged partial sectional view of an example read/write transducer 234 for perpendicularly recording data to a recording medium 212. For example, read/write transducer 234 could be incorporated into slider 120 in disc drive 100 illustrated in FIG. 1. In FIG. 2, all spacing and insulating layers are omitted for clarity. Read/write transducer 234 includes a writing element or recording device 236 and a reading element 238 formed on a trailing edge of a slider (not shown in FIG. 2). Reading element 238 includes a read sensor 240 that is spaced between a top shield 242 and a bottom shield 244. Top and bottom shields 242 and 244 operate to isolate read sensor 240 from external magnetic fields that could affect sensing bits of data that have been recorded on recording medium 212.

Writing element 236 includes a writing main pole 246 having a main pole tip 256 and a return pole 248 having a return pole tip 258. Main pole tip 256 and return pole tip 258 comprise a soft magnetic material. The soft magnetic material used to construct the pole tips includes a permeability ($\mu$) of at least 1000. Magnetic materials that have such a permeability are generally the softest magnetic materials on earth as well as magnetic materials having the highest magnetic moment. Main and return poles 246 and 248 are separated by a non-magnetic spacer 250. Main pole 246 and return pole 248 are connected at a back gap closure 252. A conductive coil 254 extends between main pole 246 and return pole 248 and around back gap closure 252. An insulating material (not shown) electrically insulates conductive coil 254 from main and return poles 246 and 248. Main and return pole tips 256 and 258 face a surface 260 of recording medium 212 and form a portion of an air bearing surface (ABS) 262 of a slider. FIG. 2 illustrates reading element 238 having separate top and bottom shields 242 and 244 from writing element 236. However, it should be noted that in other read/write transducers, return pole 248 could operate as a top shield for reading element 238.

A magnetic circuit is formed in writing element 236 by main and return poles 246 and 248, back gap closure 252, and a soft magnetic under layer (SUL) 264 of recording medium 212 which underlays a hard magnetic or storage layer 266 having perpendicular orientation of magnetization. SUL 264 comprises a soft magnetic material having a permeability substantially similar to the magnetic material of pole tips 256 and 258. Therefore, SUL 264 has a permeability and magnetic moment similar to the permeability and magnetic moment of pole tips 256 and 258. Storage layer 266 includes uniformly magnetized regions 268, each of which represent a bit of data in accordance with an up or down orientation.

In operation, an electrical current is caused to flow in conductive coil 254, which induces a magnetic flux that is conducted through the magnetic circuit. The magnetic circuit causes the magnetic flux to travel vertically through the main pole tip 256 and storage layer 266 of the recording medium, as indicated by arrow 270. Next, the magnetic flux is directed horizontally through SUL 264 of the recording medium, as indicated by arrow 272, then vertically back through storage layer 266 through return pole tip 258 of return pole 248, as indicated by arrow 274. Finally, the magnetic flux is conducted back to main pole 246 through back gap closure 252.

Main pole tip 256 is shaped to concentrate the magnetic flux traveling therethrough to such an extent that the orientation of magnetization in patterns 268 of storage layer 266 are forced into alignment with the writing magnetic field and, thus, cause bits of data to be recorded therein. In general, the magnetic field in storage layer 266 at main pole tip 256 must be twice the coercivity or saturation field of that layer. Recording medium 212 rotates in the direction indicated by arrow 276. A trailing edge 278 of main pole 246 operates as a "writing edge" that defines the transitions between bits of data recorded in storage layer 266, since the field generated at that edge is the last to define the magnetization orientation in the pattern 268.

Figure 3:
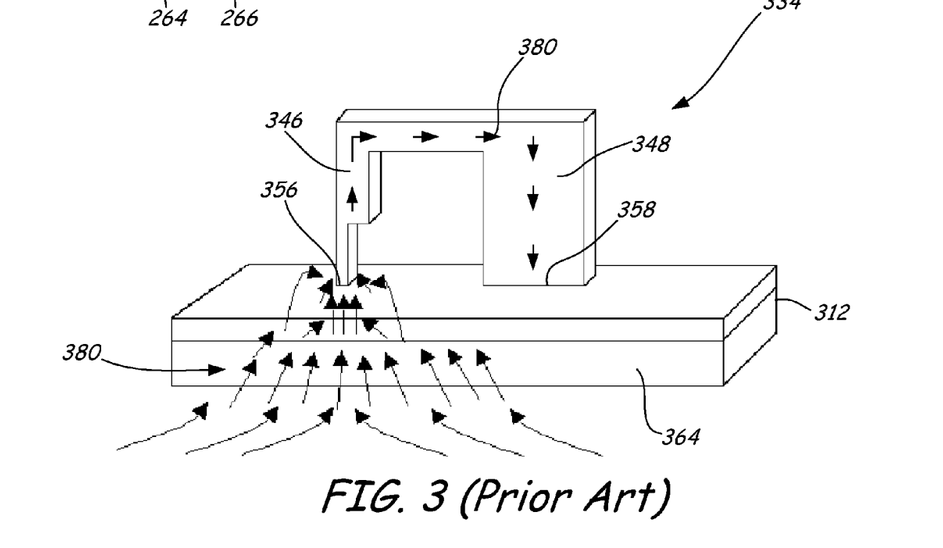
FIG. 3 is an enlarged partial perspective view of a magnetic transducer for illustrating the detrimental influence of stray fields.

FIG. 3 is a simplified partial perspective view of an example magnetic transducer 334 for illustrating the detrimental influence of stray fields. A magnetic transducer can be detrimentally influenced by stray fields external to the enclosure of the data storage system and can be detrimentally influenced by stray fields internal to the enclosure of the data storage system. Sources of external stray fields are endless especially with the ever increasing portability of disc drives. Currently, disc drives are included in automobiles, digital music players, personal data assistants (PDAs) or other mobile devices and can be exposed to high external stray fields upon being exposed to a high stray field environment. For example, if an individual were to use a laptop at a manufacturing site that included high magnetic fields, the laptop could be rendered useless because the influence of external stray fields on the magnetic transducer of the disc drive. Sources of internal stray fields originating internal to the disc drive include the voice coil motor, the spindle motor and other electronic circuitry. In most environments, a common high intensity value for both external and internal stray fields is 100 Oersteds (Oe). However, many times external and internal stray fields can be as high as 500 Oe and even between 1000 to 15000 Oe in high magnetic environments, such as the manufacturing site discussed above.

Stray fields 380, either internal or external to the disc drive, tend to generate a sizable localized magnetic field in the vicinities of the write and read elements. As illustrated in FIG. 3, stray fields 380 flow through SUL 364 of recording medium 312 and into main pole 346 and return pole 348. SUL 364 of recording medium 312 includes properties of high magnetic moment and high permeability that are substantially similar to the high magnetic moment and high permeability of pole tips 356 and 362. Therefore, SUL 364 and pole tips 356 and 362 offer a path of low resistance that stray fields 380 are attracted to and can easily follow.

Magnetic transducer 334 is spaced from recording medium 312 by a very small distance. Therefore, for all theoretical purposes, magnetic transducer 334 is thought of as touching a surface of recording medium 312. Since SUL 364 and pole tips 356 and 362 have substantially similar material properties (i.e. permeability), stray fields 380, absorbed by SUL 364, are then attracted to and tend to travel towards pole tips 356 and 362 as illustrated in FIG. 3. When stray fields 380 influence poles 346 and 348, a variety of reliability issues on the perpendicular recording process results. Example reliability issues include destabilized media magnetization and facilitation of recorded magnetization reorientation. In some cases, SUL 364 can act as a funnel to concentrate and then amplify the magnitude or level of stray fields 380. Such concentration and amplification creates a large charge in the vicinity of main pole tip 356, which can result in media magnetization reversal in non-operation modes (i.e. where the writing current is switched off).

The coefficient of stray field amplification is approximately equal to a proportion of the effective area of SUL 364 and the area of pole tips 356 and 362 that are exposed to ABS 362 (i.e. $A_{SUL}/A_p$). The effective area of SUL 364 ($A_{SUL}$) is dependent upon many factors, such as the intrinsic material properties and thickness of SUL 364. Regardless of these factors, the effective area ($A_{SUL}$) of SUL 364 is generally much larger than the ABS area ($A_p$) of pole tips 356 and 362 and, thus, facilitates a high amplification of stray fields 380. In addition, if return pole 348 of magnetic transducer 334 were to be removed, the ABS area of pole tip 356 would be smaller yet and, thus, facilitate an even higher amplification of stray fields 380.

In accordance with the present invention, a shielded magnetic material is incorporated in a data storage system to suppress the stray fields as discussed with respect to FIG. 3. The incorporation of shielding magnetic material in the configurations that will be discussed in detail below significantly reduces the stray field penetrating level and, therefore, minimizes stray field induced problems of the read/write head.

Figure 4:
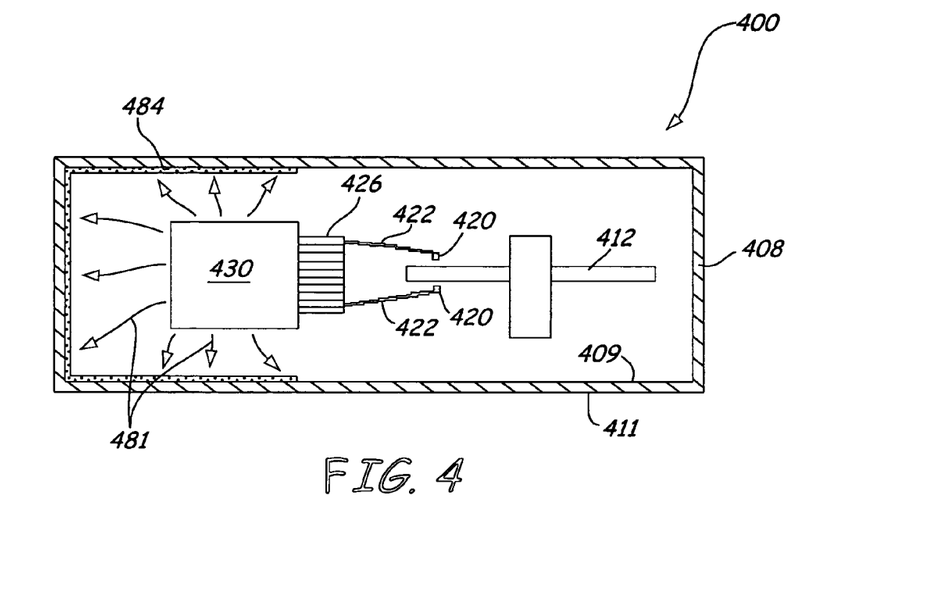
FIG. 4 illustrates a simplified sectional view of a data storage system in accordance with an embodiment of the present invention.

FIG. 4 illustrates a simplified sectional view of a data storage system 400 in accordance with an embodiment of the present invention. Data storage system 400 includes various components housed in an enclosure 408. Enclosure 408 includes an inner surface 409 and an outer surface 411. Data storage system 400 illustrates a recording medium 412 in communication with magnetic heads. Each magnetic head is located on each slider 420 and includes a recording device as illustrated in FIGS. 2 and 3. Each slider 420 is attached to a suspension 422 which is in turn attached to an actuator mechanism 426 that is operated by a voice coil motor 430. As illustrated, internal stray fields or flux 481 can emanate from voice coil motor 430. Magnetic heads located on sliders 420 need to be protected from internal stray fields 481 that are generated by voice coil motor 430.

The embodiment illustrated in FIG. 4 is useful for diverting and absorbing internal stray fields such that the internal stray field will not come in contact with the recording devices located in each magnetic head. FIG. 4 illustrates a soft magnetic material 484 that is coated on a portion of inner surface 409. As illustrated, soft magnetic material 484 is coated on the portion of inner surface 409 that is in closer proximity to voice coil motor 430 that generates internal stray fields than the recording devices in slider 420 and recording medium 412. Stray fields 481 tend to travel in a path of least resistance. Therefore, any internal stray field generated by voice coil motor 430 will be absorbed by soft magnetic material 484 instead of by recording medium 412 or the recording devices in sliders 420. The distance from the voice coil motor to the coating of soft magnetic material is less than the distance from the voice coil motor to the recording medium and the recording devices in the sliders 420. However, those skilled in the art should recognize that soft magnetic material 484 can be coated on the entire inner surface 409 of enclosure 408 or coated on other portions of the inner surface such that other sources (i.e. devices) of internal stray fields can be diverted from sliders 420. For example, if other components in data storage system 400 emanate a high internal stray field, a coating can be deposited on inner surface 409 in close proximity to the source of the internal stray field compared to the distance of the recording device in slider 420 or recording medium 412. Those skilled in the art should recognize that other configurations of coating inner surface 409 with soft magnetic material are possible such that they not only divert and absorb internal stray fields, but also divert and absorb external stray fields.

Figure 5:
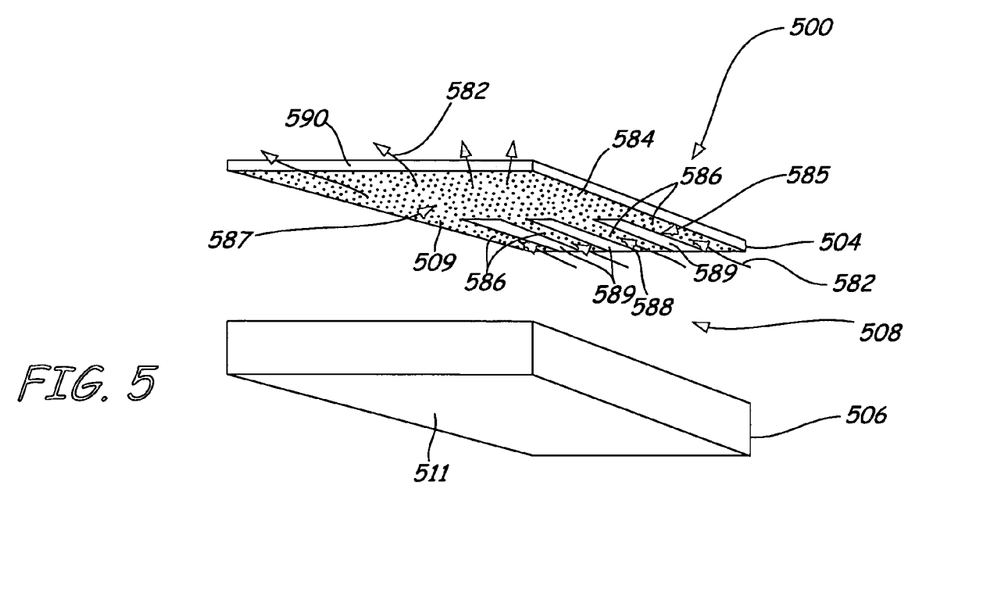
FIG. 5 illustrates an exploded perspective view of a data storage system in accordance with an embodiment of the present invention.

For example, FIG. 5 illustrates an exploded perspective view of an enclosure 508 of a data storage system 500 in accordance with an embodiment of the present invention. Although not particularly illustrated in FIG. 5, enclosure 508 houses various data storage system components arranged in such a matter as those illustrated in FIG. 4. Enclosure 508 includes a cover 504 and a base 506. Enclosure 508 also includes an inner surface 509 and an outer surface 511. As illustrated, data storage system 500 can be exposed to external stray fields 582. Recording devices within data storage system 500 need to be protected from such external stray fields 582

In accordance with the embodiment illustrated in FIG. 5, a soft magnetic material 584 is coated on a portion of inner surface 509. As illustrated, inner surface 509 includes two distinct areas that are coated with soft magnetic material 584: a conducting channel area 585 and a "getter" area 587. Conducting channel area 585 includes a plurality of conducting channels 586 coated with soft magnetic material 584 and extending from a first end 588 of cover 504 to "getter" area 587. Conducting channel area is in closer proximity to the recording medium and the magnetic transducers of data storage system 500 than the voice coil motor or other internal stray fields generator. Between each conducting channel 586 are non-coated sections 589. "Getter" area 587 is completely covered with soft magnetic material 584 and extends from conducting channel area 585 to a second end 590 of cover 504. "Getter" area is in closer proximity to the voice coil motor of data storage system 500 than the recording medium and the recording devices.

External stray fields 582 are unaffected by enclosure 508. In general, enclosure 508 is made of a non-magnetic material such as metallic steel or a non-metallic polymer. However, other materials are possible. Since the material of enclosure 508 does not affect external stray fields, external stray fields can easily enter data storage system 500. Therefore, conducting channels 586 in conducting channel area 585 can conduct the external stray fields towards "getter" area 587, thereby diverting external stray fields coming in contact with the magnetic heads. "Getter" area 587 absorbs external stray fields 582 conducted by conducting channels 586 and can simultaneously absorb internal stray fields generated by the voice coil motor. Those skilled in the art should recognize that soft magnetic material 584 can be coated on inner surface 509 of base 506 in a similar manner to the inner surface of cover 504. The configuration illustrated in FIG. 5 can be easily accomplished by depositing the soft magnetic material 584 in conjunction with using a mask.

The mask is placed over non-coated sections 589 to expose soft magnetic material 584 to conducting channels 586.

Figure 6:
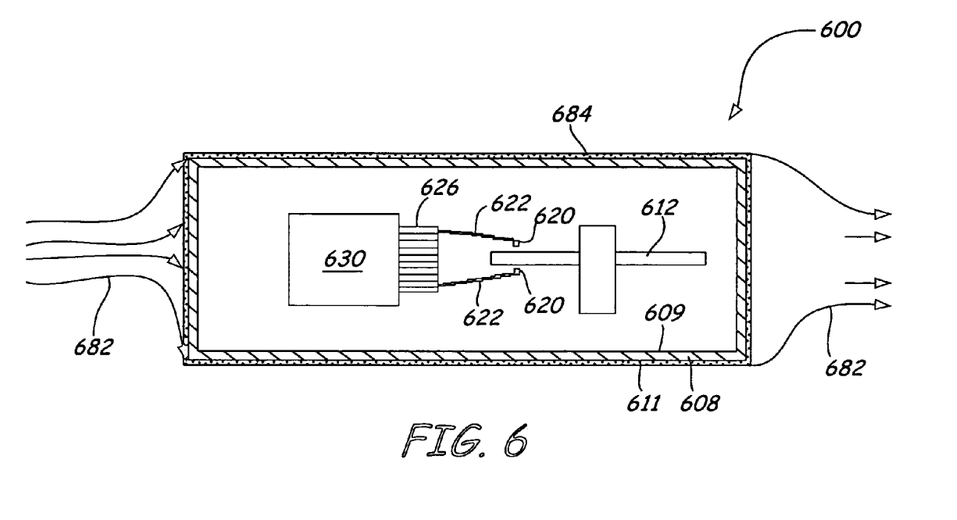
FIG. 6 illustrates a simplified sectional view of a data storage system in accordance with an embodiment of the present invention.

FIG. 6 illustrates a simplified sectional view of a data storage system 600 in accordance with an embodiment of the present invention. Data storage system 600 includes various components housed in an enclosure 608. Enclosure 608 includes an inner surface 609 and an outer surface 611. Data storage system 600 illustrates a recording medium 612 in communication with magnetic heads. Each magnetic head is located on each slider 620. Each magnetic slider 620 is attached to a suspension 622 which is in turn attached to an actuator mechanism 626 that is operated by a voice coil motor 630. As illustrated, external stray fields 682 are in contact with data storage system 600. Magnetic heads located on sliders 620 need to be protected from these external stray fields 582.

In accordance with an embodiment of the present invention, a soft magnetic material 684 is coated on outer surface 611 of data storage system 600. As illustrated, the entire outer surface 611 is completely covered with soft magnetic material 684 to facilitate the diversion of external stray field from the magnetic heads. However, those skilled in the art should recognize that other configurations of coating outer surface 611 with soft magnetic materials are possible.

Figure 7:
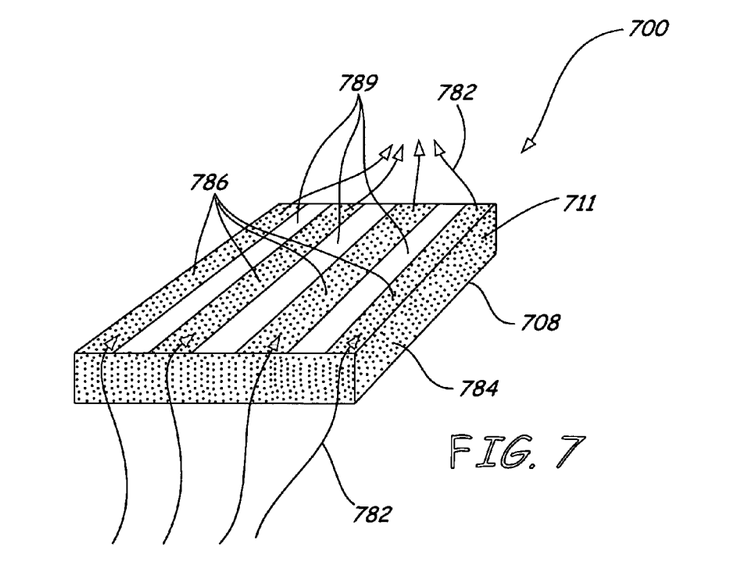
FIG. 7 illustrates a perspective view of a data storage system in accordance with an embodiment of the present invention.

For example, FIG. 7 illustrates a perspective view of a data storage system 700 in accordance with an embodiment of the present invention. Although not particularly illustrated, enclosure 708 houses various data storage system components arranged in such a manner as those illustrated in FIG. 6. Enclosure 708 includes an outer surface 711. As illustrated in FIG. 7, a soft magnetic material 784 is coated on a portion of outer surface 711 to form conducting channels 786. Each conducting channel 786 is spaced from each other by a non-coated section 789. Each conducting channel 786 allows external stray fields 782 to travel along its length and be diverted from penetrating enclosure 708 of data storage system 700. Although FIG. 7 illustrates conducting channels 786 located on a cover of the data storage system, those skilled in the art should recognize that conducting channels 786 can also be located on a base of the data storage system. Such a coating configuration can be easily accomplished by depositing the soft magnetic material 784 in conjunction with a mask as previously discussed with respect to FIG. 5.

Figure 8:
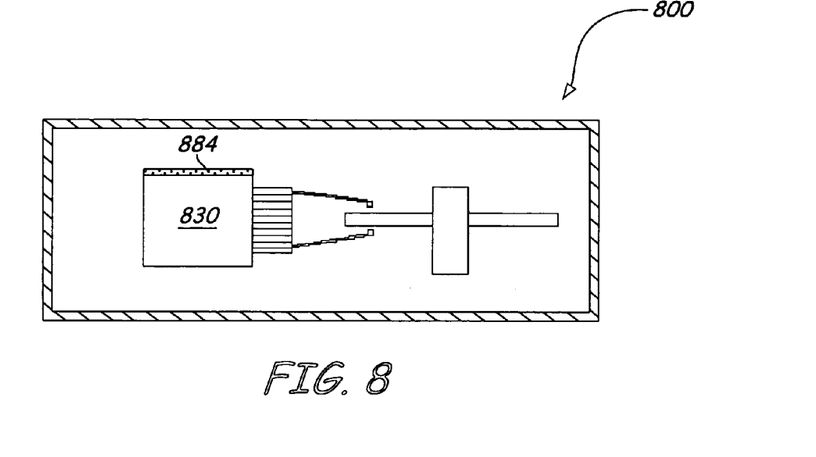
FIG. 8 illustrates a simplified sectional view of a data storage system in accordance with an embodiment of the present invention.

In other embodiments of the present invention, the data storage systems illustrated in FIGS. 6 and 7 can include a coating of soft magnetic material on an inner surface of the enclosure as illustrated in FIG. 4. Coating an outer surface and a portion of an inner surface of the enclosure of a data storage system will help to absorb and divert both external stray fields as well as internal stray fields. In addition, the data storage systems of FIGS. 4-7 can include coatings of soft magnetic material deposited on various data storage system components. For example and as illustrated in data storage system 800 of FIG. 8, soft magnetic material 884 can be coated on voice coil motor 830. It should be noted that other components can include coatings of soft magnetic material, such as base plates for the voice coil motor, electronic boards and the spindle motor.

The coatings of soft magnetic material illustrated in FIGS. 4-8 have a permeability that is at least as great as approximately the permeability of the SUL of recording medium and the recording devices located within each data storage system 400, 500, 600, 700 and 800. In general, the recording medium and pole tips of the magnetic heads have a permeability of at least 1000. Therefore, the permeability of the soft magnetic material coated in FIGS. 4-8 has a permeability of at least as great as approximately 1000. Soft magnetic materials that are useful in the present invention have small switching fields (i.e. 0.01-5.0 Oe) and a large permeability. Example materials include: nickel iron (NiFe), nickel iron cobalt (NiFeCo), cobalt zirconium (CoZr), cobalt zirconium chromium (CoZrCr), cobalt zirconium niobium (CoZrNb), cobalt iron (CoFe), iron (Fe), iron nitrogen (FeN), iron silicon aluminum (FeSiAl), iron cobalt boron (FeCoB), iron cobalt carbon (FeCoC) and other types of cobalt alloys.

The thickness of the soft magnetic coatings illustrated in FIGS. 4-8 can range from as little as 10 nanometers (nm) to as much as 1000 nm. To completely absorb a stray field with an intensity that is below 500 Oe, the soft magnetic coating illustrated in FIGS. 4-8 should have a thickness of between 10 to 50 nm. To completely absorb a stray field that has intensity as high as 10,000 to 15,000 Oe the soft magnetic coating illustrated in FIGS. 4-8 should have a thickness of 200 nm. Although a thickness of 10 to 50 nm can not completely absorb a stray field having an intensity of 10,000 to 15,000 Oe, a thickness of 10-50 nm can divert such an intense stray field. A coating of soft magnetic material having a thickness as discussed is very lightweight. In addition, a coating of soft magnetic material can easily be applied to polymer-type enclosures of data storage systems with the use of an adhesive.

Figure 9:
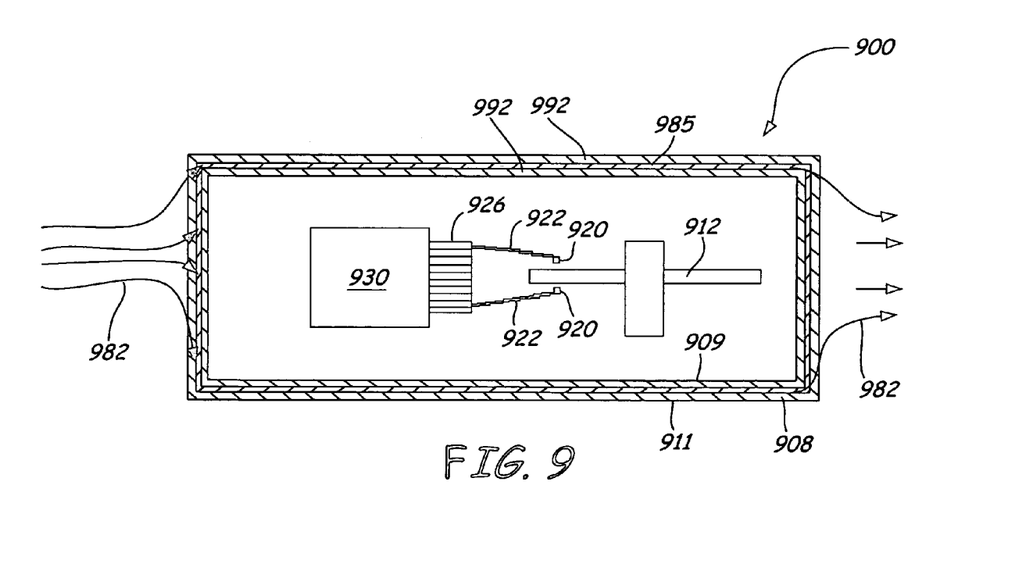
FIG. 9 illustrates a simplified sectional view of a data storage system in accordance with an embodiment of the present invention.

FIG. 9 illustrates a simplified sectional view of a data storage system 900 in accordance with an embodiment of the present invention. Data storage system 900 includes various components housed in an enclosure 908 having an inner surface 909 and an outer surface 911. Components include a recording medium 912, sliders 920 having magnetic heads, suspensions 922, an actuator mechanism 926 and a voice coil motor 930. As illustrated, external stray fields 982 are in contact with data storage system 900. Magnetic heads located on sliders 920 need to be protected from these external stray fields 982.

In accordance with an embodiment of the present invention, a layer 985 of soft magnetic material is sandwiched between two layers of material 992 of an enclosure of a conventional data storage system. For example, layers 992 can be layers of non-magnetic metallic steel or aluminum. As illustrated soft magnetic material layer 985 encompasses the entire data storage system 900 to facilitate the diversion of external stray fields 982 from the magnetic heads.

Figure 10:
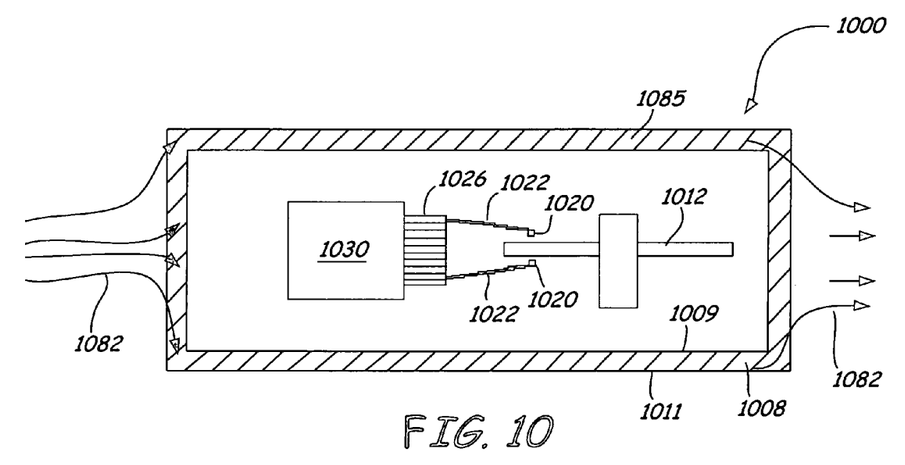
FIG. 10 illustrates a simplified sectional view of a data storage system in accordance with an embodiment of the present invention.

FIG. 10 illustrates a simplified sectional view of a data storage system 1000 in accordance with an embodiment of the present invention. Data storage system 1000 includes various components housed in an enclosure 1008 having an inner surface 1009 and an outer surface 1011. Components include a recording medium 1012, sliders 1020 having magnetic heads, suspensions 1022, an actuator mechanism 1026 and a voice coil motor 1030. As illustrated, external stray fields 1082 are in contact with data storage system 1000. Magnetic heads located on sliders 1020 need to be protected from these external stray fields 1082.

In accordance with an embodiment of the present invention, enclosure 1008 is made of a soft magnetic material 1085. As illustrated enclosure 1008 encompasses all components in data storage system 1000 and thereby facilitates the diversion of external stray fields 1082 from the magnetic heads.

It should be noted that components within data storage systems 900 and 1000 can also be made with soft magnetic material alloys, such as NiFe, to shut or divert inner stray field from the magnetic heads and recording medium to the shielded enclosure. Example components include base plates of the voice coil motor, electronic boards and the spindle of the spindle motor.

The soft magnetic material illustrated in FIGS. 9-10 has a permeability that is at least as great as approximately the permeability of the SUL of the recording medium and the recording devices located within each data storage system 900 and 100. In general, the recording medium and pole tips of the magnetic heads have a permeability of at least 1000. Therefore, the permeability of the soft magnetic material coated in FIGS. 9 and 10 has a permeability of at least as great as approximately 1000. The soft magnetic materials of FIGS. 9 and 10 can include example materials as previously discussed with respect to the soft magnetic material of FIGS. 4-8.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data storage system while maintaining substantially the same functionality without departing from the scope and spirit of the present invention. In addition, although the preferred embodiment described herein is directed to a data storage system for, it will be appreciated by those skilled in the art that the teachings of the present invention can be applied to other types of magnetic systems, without departing from the scope and spirit of the present invention.

What is claimed is:

1. A data storage system comprising:
    an enclosure;
    at least one recording device positioned within the enclosure and in communication with a recording medium;
    wherein the enclosure includes a soft magnetic material for shielding magnetic stray fields from the recording device, the soft magnetic material comprising:
        a getter area configured to absorb magnetic stray fields; and
        at least one conducting channel coupled to the getter area and in closer proximity to the recording device and the recording medium than the getter area, each conducting channel spaced apart from each other by sections void of soft magnetic material such that magnetic stray fields are directed towards the getter area for absorption.

2. The data storage system of claim 1, wherein the soft magnetic material comprises a permeability that is at least as great as approximately the permeability of magnetic material in the recording device.

3. The data storage system of claim 1, wherein the soft magnetic material of the getter area and the soft magnetic material of the at least one conducting channel are deposited on an inner surface of the enclosure.

4. The data storage system of claim 1, wherein the soft magnetic material of the getter area is in closer proximity to a device that generates internal magnetic stray fields than to the recording device and the recording medium.

5. The data storage system of claim 1, wherein the getter area is completely covered with the soft magnetic material.

6. The data storage system of claim 1, wherein the soft magnetic material is further deposited on an outer surface of the enclosure.

7. The data storage system of claim 6, wherein the soft magnetic material deposited on the outer surface of the enclosure comprises at least one conducting channel, each conducting channel spaced apart from each other by sections void of soft magnetic material such that external magnetic stray fields are diverted from penetrating the enclosure.

8. The data storage system of claim 1, wherein the soft magnetic material of the getter area and the soft magnetic material of the at least one conducting channel are deposited on an inner surface of the enclosure and the soft magnetic material is further deposited on an outer surface of the enclosure.

9. The data storage system of claim 1, further comprising a soft magnetic coating deposited on components housed in the enclosure that generate internal magnetic stray fields.

10. The data storage system of claim 1, wherein the soft magnetic material is further sandwiched between layers of non-magnetic material.

11. The data storage system of claim 1, further comprising components housed in the enclosure that generate magnetic stray fields are formed with a soft magnetic material.

12. An enclosure having a transducing device comprising:
    a soft magnetic material for shielding magnetic stray fields from the transducing device, the soft magnetic material comprising:
        at least one conducting channel deposited on an outer surface of the enclosure, each conducting channel spaced apart from each other by sections void of soft magnetic material such that magnetic stray fields originating external to the enclosure are diverted from penetrating the enclosure.

13. The enclosure system of claim 12, wherein the soft magnetic material is further deposited on at least a portion of the inner surface of the enclosure.

14. The system of claim 13 wherein the soft magnetic material is deposited on the portion of the inner surface in close proximity to a device in the enclosure that generates internal magnetic stray fields.

15. The system of claim 13 wherein the soft magnetic material deposited on the portion of the inner surface comprises:
    at least one conducting channel area located at a first end of the enclosure, each conducting channel spaced apart from each other by sections void of the soft magnetic material, and configured to conduct magnetic stray fields originating external to the enclosure; and
    a getter area located at a second end of the enclosure and coupled to the at least one conducting channel, the getter area configured to receive the external magnetic stray fields conducted by the at least one conducting channel.

16. The system of claim 15, wherein the getter area of the soft magnetic material is in close proximity to a device that generates internal magnetic stray fields.

17. The system of claim 12, wherein the enclosure is a data storage system comprising:
    a recording medium in communication with the transducing device, wherein the recording medium includes a layer of a magnetic material that has a permeability that is substantially similar to a permeability of a magnetic material in the transducing device; and
    wherein the soft magnetic material deposited on the portion of the inner surface of the enclosure has a permeability that is at least as great as approximately the permeability of the layer of magnetic material of the recording medium.

18. An enclosure having a transducing device comprising:
a soft magnetic material for shielding magnetic stray fields from the transducing device, the soft magnetic material comprising:
   a getter area configured to absorb magnetic stray fields; and
   at least one conducting channel coupled to the getter area and in closer proximity to the transducing device than the getter area, each conducting channel spaced apart from each other by sections void of soft magnetic material such that magnetic stray fields are directed towards the getter area for absorption.

19. The enclosure of claim 18, wherein the soft magnetic material of the getter area and the soft magnetic material of the at least one conducting channel are deposited on an inner surface of the enclosure.

20. The data storage system of claim 1, wherein the soft magnetic material of the getter area is in closer proximity to a device that generates internal magnetic stray fields than the transducing device.

* * * * *

UNITED STATES PATENT AND TRADEMARK OFFICE
CERTIFICATE OF CORRECTION

PATENT NO. : 7,474,499 B2  Page 1 of 1
APPLICATION NO. : 11/190739
DATED : January 6, 2009
INVENTOR(S) : Li et al.

It is certified that error appears in the above-identified patent and that said Letters Patent is hereby corrected as shown below:

Title page, item (56), References Cited, U.S. PATENT DOCUMENTS, please change "Knaooenberger" to --Knappenberger--.

Col. 10, line 48 claim 15, delete "," after material.

Signed and Sealed this

Seventh Day of April, 2009

JOHN DOLL
*Acting Director of the United States Patent and Trademark Office*